(12) United States Patent
Vande Vyvere

(10) Patent No.: US 10,093,281 B2
(45) Date of Patent: Oct. 9, 2018

(54) WIPER

(71) Applicant: MOERMAN NV, Meulebeke (BE)

(72) Inventor: Guy Vande Vyvere, Wortegem-Petegem (BE)

(73) Assignee: MOERMAN NV, Meulebeke (BE)

( * ) Notice: Subject to any disclaimer, the term of this patent is extended or adjusted under 35 U.S.C. 154(b) by 359 days.

(21) Appl. No.: 14/943,251

(22) Filed: Nov. 17, 2015

(65) Prior Publication Data

US 2016/0137169 A1    May 19, 2016

(30) Foreign Application Priority Data

Nov. 18, 2014    (BE) .................................. 2014/5069

(51) Int. Cl.
| | | |
|---|---|---|
| *B60S 1/38* | (2006.01) | |
| *A47L 1/06* | (2006.01) | |
| *A47L 13/11* | (2006.01) | |

(52) U.S. Cl.
CPC ............. *B60S 1/3886* (2013.01); *A47L 1/06* (2013.01); *A47L 13/11* (2013.01); *B60S 2001/3812* (2013.01)

(58) Field of Classification Search
CPC .. A47L 1/06; A47L 13/11; A47L 13/12; B60S 1/3886; B60S 2001/3812; B60S 3/045
USPC .......................................... 15/118, 121, 245
See application file for complete search history.

(56) References Cited

U.S. PATENT DOCUMENTS

| | | | | | |
|---|---|---|---|---|---|
| 635,462 | A | * | 10/1899 | Bourke ...................... | A47L 1/06 15/245 |
| 2,230,583 | A | * | 2/1941 | Borden ................... | A47B 25/00 15/245 |
| 2,904,807 | A | * | 9/1959 | Obergfell .................. | A47L 1/06 15/105 |
| 4,654,919 | A | * | 4/1987 | Liberman ............... | E04F 21/06 15/235.4 |
| 5,074,027 | A | * | 12/1991 | Alviar ..................... | A47L 13/11 15/245 |
| 5,184,372 | A | * | 2/1993 | Mache .................. | A47L 7/0009 15/245 |
| 5,349,716 | A | * | 9/1994 | Millar ....................... | A47L 1/06 15/236.06 |
| 5,351,357 | A | * | 10/1994 | Liberman ............... | E04F 21/06 15/245 |
| 5,381,581 | A | * | 1/1995 | Samuelsson .............. | A47L 1/06 15/236.01 |

(Continued)

FOREIGN PATENT DOCUMENTS

| | | |
|---|---|---|
| DE | 10052520 A1 | 5/2001 |
| EP | 2474258 A2 | 7/2012 |
| JP | 2005226433 A | 8/2005 |

OTHER PUBLICATIONS

European Search Report dated Apr. 8, 2016.

*Primary Examiner* — Weilun Lo
(74) *Attorney, Agent, or Firm* — Symbus Law Group, LLC; Clifford D. Hyra

(57) ABSTRACT

A wiper (1) comprising an elongate cleaning strip (2) which is substantially made of flexible material and a holder (3) for fixating the cleaning strip (2). Viewed along the longitudinal direction (9) of the cleaning strip (2), the cleaning strip (2) comprises a wiping edge (4) for wiping panes, and a wiping strip (5) comprising said wiping edge (4) which extends beyond the holder (3) along substantially its entire length. The holder (3) furthermore comprises retaining supports (6) which, at the location of the ends (7) of the wiping strip (5), extend along the wiping strip (5) almost as far as the wiping edge (4).

13 Claims, 4 Drawing Sheets

(56) References Cited

U.S. PATENT DOCUMENTS

| | | | | |
|---|---|---|---|---|
| 2002/0100135 A1* | 8/2002 | Machesky | ............... | A47L 1/06 15/245 |
| 2004/0221412 A1* | 11/2004 | Tirkkonen | ............... | A47L 1/06 15/245 |
| 2006/0010635 A1* | 1/2006 | Varner | ............... | A47L 1/06 15/245 |
| 2012/0174332 A1* | 7/2012 | Patterson | ............... | A47L 1/06 15/245 |

* cited by examiner

WIPER

The present application claims priority from Belgian Patent Application No. BE-2014/5069 filed on Nov. 18, 2014, which is incorporated herein by reference.

FIELD OF THE INVENTION

The present invention relates to a wiper comprising an elongate cleaning strip which is substantially made of flexible material and a holder for fixating the cleaning strip, wherein the cleaning strip comprises a wiping strip which protrudes with respect to the holder along substantially its entire length and comprises a wiping edge which extends along the longitudinal direction of the cleaning strip.

The cleaning strip may be releasably connected to the holder, so that the cleaning strip is replaceable when it shows signs of wear.

BACKGROUND

Existing wipers always have a wiping strip of the cleaning strip, comprising the wiping edge, which, viewed along the longitudinal direction of the cleaning strip, extends beyond the holder. This wiping strip is not hampered by the holder and is freely displaceable on a window pane, so that the pane is wipeable by means of the wiper.

When wiping panes using existing wipers, the wiping edge is normally situated against the pane along its entire length, as a result of which the pane is readily wipeable without stripes forming. The term panes may refer to panes of windows, cars, etc., but may also include glass panels or the like which (partly) separate spaces or rooms from one another.

However, it is a drawback of the existing wipers that, at the location of the rim/profile of the panes, it is difficult to wipe the pane properly with these existing wipers. The reason for this is that when an end of the wiping edge comes into contact with said rim, it will tend to move from the pane onto the rim. As a result thereof, it is very difficult to press the wiping edge against the pane over its entire length in the vicinity of the rim. Consequently, the pane is not wiped properly at the location of the rim and cleaning liquid remains behind at the location of said rim. In order to achieve a good end result, use is therefore often made of an additional wiping element, such as a rag or the like, to wipe the pane at the location of the rim. This is obviously labour-intensive and also takes time.

SUMMARY

It is therefore an object of the invention to produce a wiper in which the wiping edge does not have the tendency to move from the pane onto the rim/profile of the pane when the wiper is positioned on the pane in the vicinity of the rim/profile, so that the pane is properly wipeable in a quick and simple manner, without the need for additional wiping elements.

This object is achieved by providing a wiper comprising an elongate cleaning strip which is substantially made of flexible material and a holder for fixating the cleaning strip, wherein the cleaning strip comprises a wiping strip which protrudes with respect to the holder along substantially its entire length and comprises a wiping edge which extends along the longitudinal direction of the cleaning strip, wherein the holder, at the location of the two ends of the wiping strip, comprises a respective retaining support with a support surface which extends opposite the surface of the wiping strip and extends substantially up to the wiping edge in order to retain the wiping strip locally during use of the wiper.

In order to wipe a pane, a wiper is positioned on the pane in such a manner that the wiping edge makes contact with the pane. The wiper is then pushed further against the pane and displaced along the pane with a surface of the wiping strip making contact with the pane. For the sake of convenience, this surface is referred to here as the bottom surface of the wiping strip, while the opposite surface is referred to here as the top surface of the wiping strip. Since the bottom surface of the wiping strip obviously has to remain free in order for the latter to be able to make contact with the pane, the support surfaces of the retaining supports will extend along the top surface of the wiping strip at the location of the ends of the wiping strip. In order to be able to clean a pane properly, the wiping strip has to have a certain flexibility/freedom of movement. When pushing the bottom surface of the wiping strip against the pane, the wiping strip thus has to be able to move upwards slightly and therefore has to be able to bend somewhat. This flexibility is given, since the wiping strip protrudes beyond the holder along substantially its entire length and is thus not hampered by the holder.

By means of the retaining supports, the freedom of movement of the wiping strip is restricted at its ends. Here, the ends of the wiping strip are pressed against the pane by the retaining supports while a pane is being wiped, as a result of which the ends of the wiping strip can hardly bend upwards, if at all. The retaining supports thus retain the ends of the wiping strip. As a result thereof, the tendency of the wiping edge to move from the pane to the rim in the vicinity of the rim of the pane while a pane is being wiped will be reduced. The wiping edge will therefore always be pressed against the pane over its entire length, as a result of which the former can perform its wiping function over its entire length. The pane is then also properly wipeable in the vicinity of the rim, so that there is no need to provide an additional wiping element.

In a preferred embodiment, the retaining supports, at least at the location of the wiping strip, are substantially made of a material whose elasticity is lower than the elasticity of the material of the cleaning strip. As a result thereof, the retaining supports are able to (partly) prevent the bending of the wiping strip at the location of its ends. Said material preferably still has a certain elasticity/flexibility, so that the wiping edge is also able to move slightly at its ends during wiping of a pane. As a result thereof, the wiper can still easily be moved across the pane during wiping of the pane. Due to the reduced elasticity of said material, the freedom of movement of the wiping strip is smaller at its ends than at the location of its other parts, so that the wiping edge will not move from the pane onto the rim during wiping of a pane.

The material of the retaining supports preferably has a mode of elasticity E of at least 800 N/mm$^2$, more preferably at least 1000 N/mm$^2$, with polypropylene with a mode of elasticity of approximately 1200 N/mm$^2$ being used, for example.

The material of the cleaning strip preferably has a mode of elasticity E of at most 100 N/mm$^2$, more preferably at most 50 N/mm$^2$, with a cleaning strip made of rubber with a mode of elasticity of approximately 0.5 to 20 N/mm$^2$ being used, for example.

The holder is, for example, made of a material having a mode of elasticity E which is at least 5000 N/mm$^2$. Thus, the holder is for example substantially made from aluminium having a mode of elasticity of approximately 6900 N/mm$^2$.

Preferably, at least at the location of the wiping strip, the retaining supports are substantially made of a material with a hardness of less than 150 Shore D. More preferably, this hardness is less than 100 Shore D. In a most preferred embodiment, the retaining supports have a hardness of at most 90 Shore D. An ideal hardness for the material of the retaining supports is between 60 and 90 Shore D. Since this material is situated in the vicinity of the wiping edge, this material may come into contact with the pane. Obviously, the material should not be able to make any scratches in the pane if this does occur. The hardness of the material is therefore preferably smaller than the hardness of glass. Glass has a hardness of 6 to 7 Mohs. Also preferably, the hardness of the material is smaller than the hardness of aluminium or hard PVC. The reason for this is that the rim of panes is often made of aluminium which usually has a hardness of approximately 3 Mohs or of hard PVC with a hardness of approximately 100 to 150 Shore D. The cleaning strip is often made of rubber, preferably having a hardness of between 40 and 70 Shore A.

Furthermore, the retaining supports, at least at the location of the wiping strip, are substantially made of plastic. Plastic is readily obtainable and plastic can easily be formed into the desired shape. As a result thereof, the retaining supports may be formed into a shape which ensures that preventing the (partial) bending of the wiping strip at its ends is carried out in an optimum manner. Thus, the material may be, for example, polypropylene. The retaining supports are preferably made of polypropylene with a hardness of between 60 and 90 Shore D.

For the sake of simplicity, said retaining support is preferably made completely from the same material.

In a highly preferred embodiment, the distance, viewed along the longitudinal direction of the cleaning strip, between the support surface of the retaining supports and the surface of the wiping strip diminishes towards the ends of the wiping strip. Since the retaining supports extend along the top surface of the wiping strip, the distance between the top surface of the wiping strip and the support surfaces of the retaining supports is indicated here. As a result thereof, the bending of the ends of the wiping edge, during wiping of a pane, is (partly) prevented very well. The retaining supports are thus provided here in order to retain the wiping edge very well. The wiping strip in the vicinity of the ends of the wiping edge is also retained here by the retaining supports, albeit to a lesser extent than the ends of the wiping edge itself. Since the wiping strip is also retained in the vicinity of its ends by the retaining supports, the retaining of the ends of the wiping strip is performed gradually, as a result of which the ends of the wiping strip are retained well and the risk of the wiping edge moving from the pane onto the rim of the pane during wiping of a pane is reduced.

Furthermore preferably, the support surface of each retaining support touches the opposite surface of the wiping strip at the location of the ends of the wiping strip. Displacement of the wiping edge from the pane onto the rim is certainly prevented in this case, since the retaining supports always make contact with the wiping strip during wiping of the pane and thus continually press down the ends of the wiping strip and thus towards the pane. As a result thereof, the ends of the wiping strip will not be bent sufficiently during wiping of the pane for the wiping edge to end up on the rim of the pane.

Still more preferably, the retaining supports keep the wiping strip, at the location of its ends, in a bent position with respect to the longitudinal direction of the wiping strip. The expression a bent position is understood to mean that the retaining supports bend the ends downwards when the wiper is not being pressed against a pane. In this case, the ends of the wiping strip are bent in such a way that they extend towards the pane just before the wiper is placed onto the pane. As a result thereof, the ends of the wiping strip are pressed tightly against the glass, as a result of which the risk of the wiping edge moving from the pane onto the rim during wiping of the pane is small.

In a preferred embodiment, each retaining support has an end edge which extends along the surface of the wiping strip almost as far as the wiping edge, and which in this case makes an angle (α) with the longitudinal direction, this angle (α) being between 5 and 30°. Furthermore preferably, this angle is between 5° and 15°. Still more preferably it is +/−10°. This angle is viewed along a plane which extends perpendicularly to the cleaning strip and extends along the longitudinal direction of the cleaning strip. Said end edge extends downwards towards the ends in the direction of the wiping strip. This end edge thus approaches the wiping strip at this angle (α). At this angle (α), the end of each wiping edge is reliably retained and the wiping strip in the vicinity of this end is also retained to a sufficient degree. Here, the retaining supports thus bend downwards at the location of the wiping strip, in the direction of the ends.

Preferably, the holder comprises an elongate central portion which extends along the longitudinal direction of the cleaning strip and the retaining supports are attached to the ends of the central portion and thus form the ends of the holder. The central portion of the holder may in this case be made of a strong hard material, as a result of which the cleaning strip is reliably and securely attached to the holder and the holder can be made sufficiently strong as such. Here, the retaining supports can easily be made separately and placed on the central portion. Thus, the retaining supports may, for example, be made entirely of plastic, such as polypropylene.

The central portion may, for example, be provided with a channel-shaped holder, in which the cleaning strip is arranged along substantially its entire length. This central portion may, in addition, have a plate part which extends along substantially the entire length of the cleaning strip along the top surface of the cleaning strip up to said wiping strip with wiping edge, so that the wiping strip remains free. The upward freedom of movement of the cleaning strip is consequently limited, while the wiping strip still has sufficient freedom of movement. Each retaining support may then comprise an end edge which continues above the wiping strip from the plate part and extends obliquely to the end of the wiping strip at the location of the wiping edge at an angle with the longitudinal direction, in the plane of the top surface, said angle being between 5° and 20°. In this case, the retaining supports then extend from the plate part obliquely upwards above the wiping strip towards the end of the wiping strip at the location of the wiping edge at an angle with the longitudinal direction, in the plane of the top surface, this angle being between 5° and 20°. This angle is thus viewed along a plane which extends along the top surface of the cleaning strip.

Furthermore preferably, the central portion is substantially made of metal, such as for example stainless steel. Stainless steel is non-corroding and thus ideal for a wiper which frequently comes into contact with water.

Also furthermore preferably, the retaining supports extend substantially entirely along the end portions of the cleaning strip. Thus, not only is the cleaning strip retained by the retaining supports at the location of the wiping strip, but the end portions of the cleaning strip are retained substantially entirely. As a result thereof, it is difficult for the cleaning strip to move to the rim over its entire end portions during the wiping of a pane, as a result of which the wiping edge cannot move from the pane onto the rim either. In this case, the retaining supports extend above the entire end portions of the cleaning strip.

Still furthermore preferably, the end portions of the cleaning strip are bevelled in the direction of the wiping edge. Thus, the end portions of the cleaning strip are for example bevelled divergently in the direction of the wiping edge. The bevelled end portions may for example make an angle with the longitudinal direction of the cleaning strip which is between 35° and 60°, more preferably between 40° and 50°. As a result thereof, a said end portion of the cleaning strip ends substantially in a point, which makes the wiper highly maneuverable. As a result thereof, the wiping edge can be arranged parallel to a surface on which the person who wipes the pane is situated, but may also be placed in such a manner that the wiping edge makes an angle with said surface. As a result thereof, the person who handles the wiper can use flowing movements across the pane surface. Also, the water is drained off efficiently via said point during wiping. If the wiping edge is positioned obliquely with respect to said surface, the water will be drained off downwards via said point. By then holding a soaper under said point, the liquid used to clean the pane can readily be caught.

BRIEF DESCRIPTION OF THE DRAWINGS

In the following description, a wiper according to the present invention is described in detail. The sole aim of this detailed description is to indicate how the invention can be embodied and to illustrate the particular features of the invention and explain them, where necessary. Therefore, this description can by no means be regarded as a limitation of the scope of this patent protection. Likewise, the area of application of the invention cannot be limited on the basis of the following description.

In this description, reference is made to the attached figures, in which.

DETAILED DESCRIPTION OF THE DRAWINGS

Figure 1:
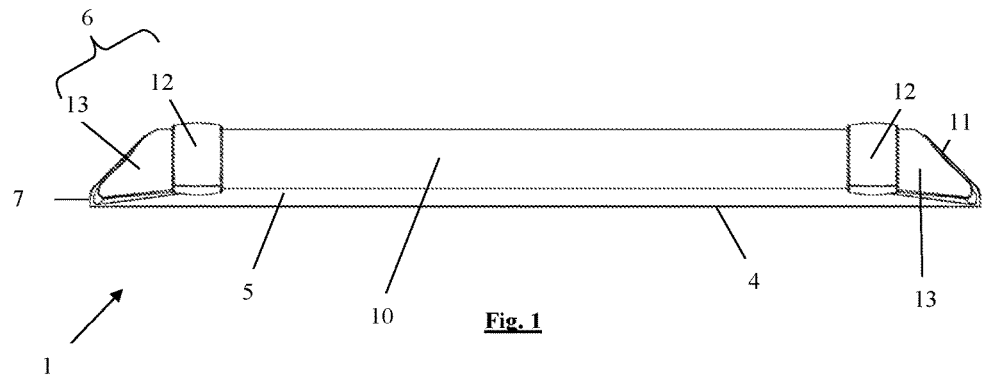
FIG. 1 shows a top view of a wiper according to the invention.
Figure 2:
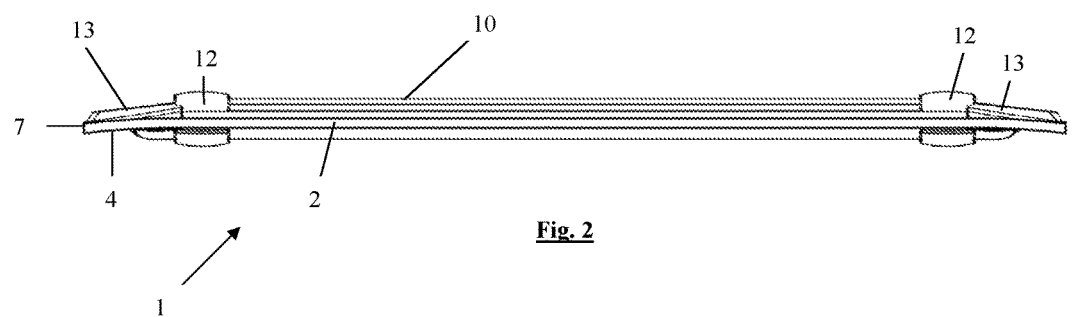
FIG. 2 shows a front view of the wiper illustrated in FIG. 1.
Figure 3:
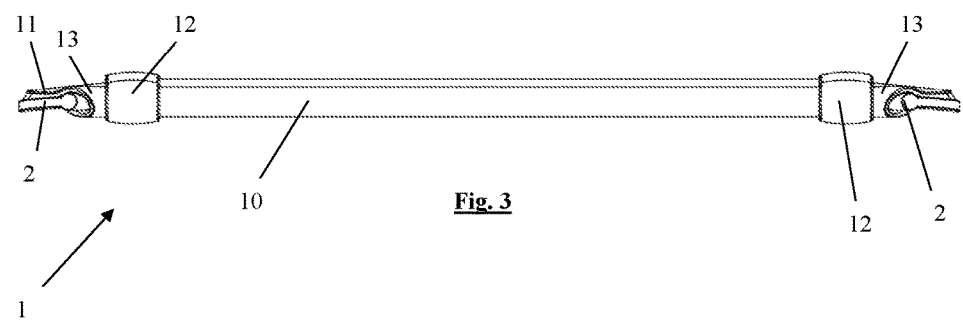
FIG. 3 shows a rear view of the wiper illustrated in FIGS. 1 and 2.
Figure 4:
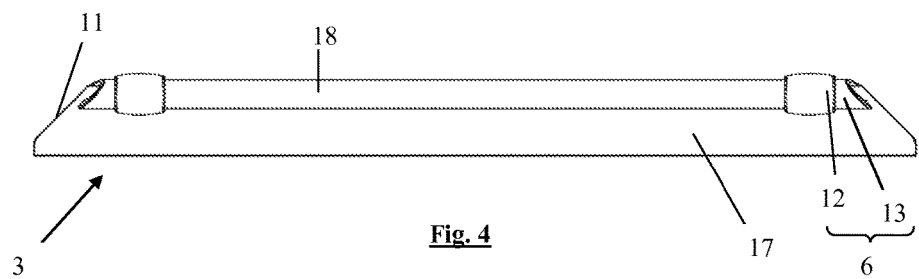
FIG. 4 shows a bottom view of the holder of the wiper illustrated in FIGS. 1 to 3.
Figure 5:
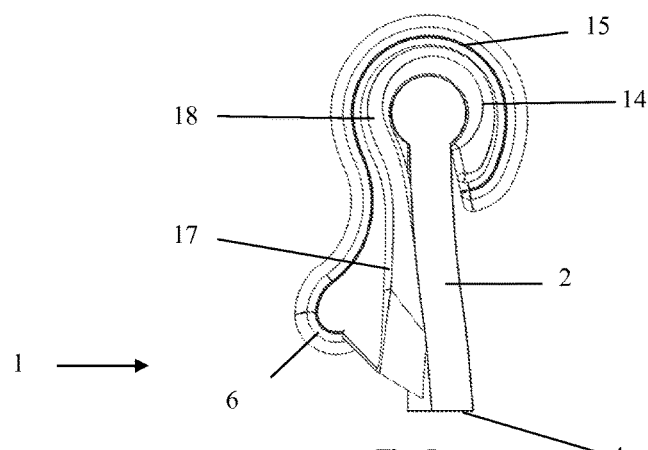
FIG. 5 shows a side view of the wiper illustrated in FIGS. 1 to 3.
Figure 6:
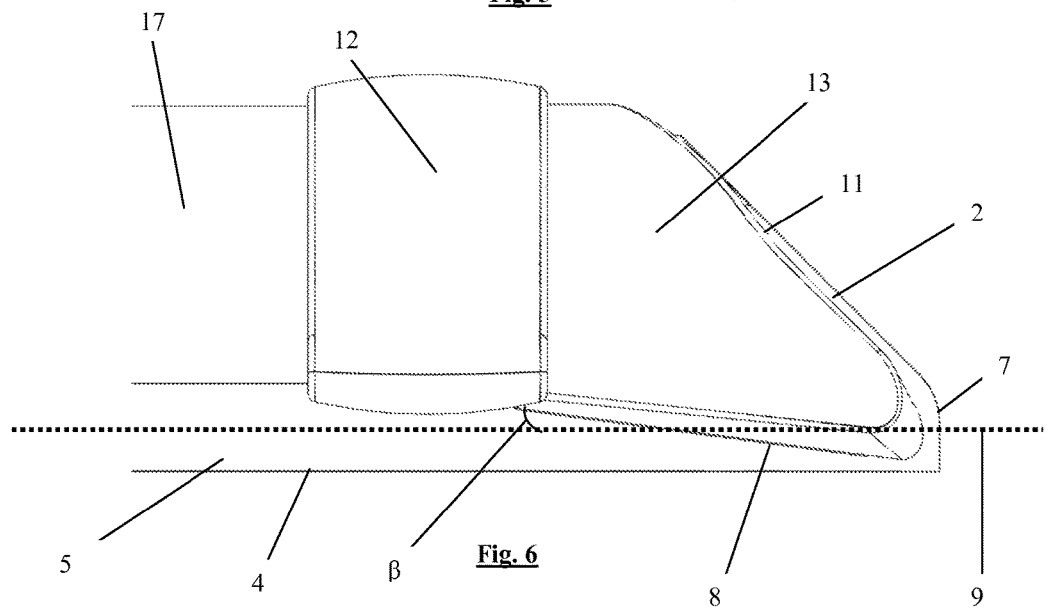
FIG. 6 shows a detail view of the top view illustrated in FIG. 1.
Figure 7:
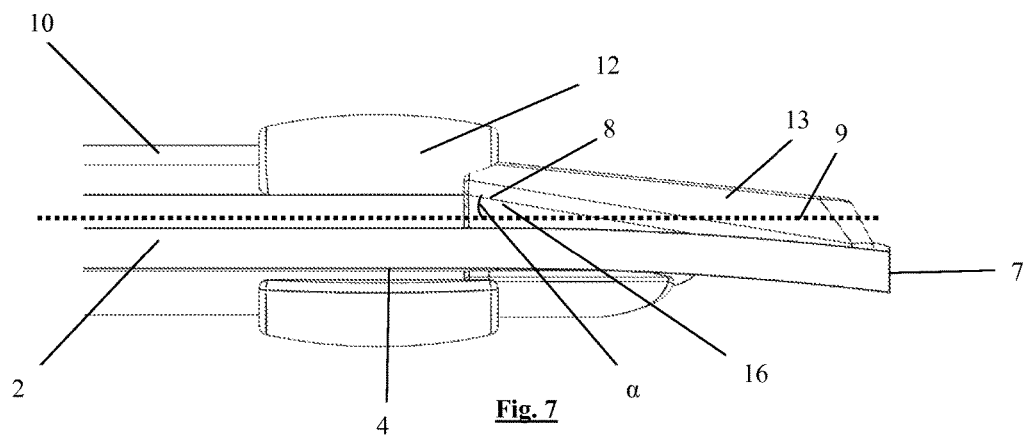
FIG. 7 shows a detail view of the front view illustrated in FIG. 2.
Figure 8:
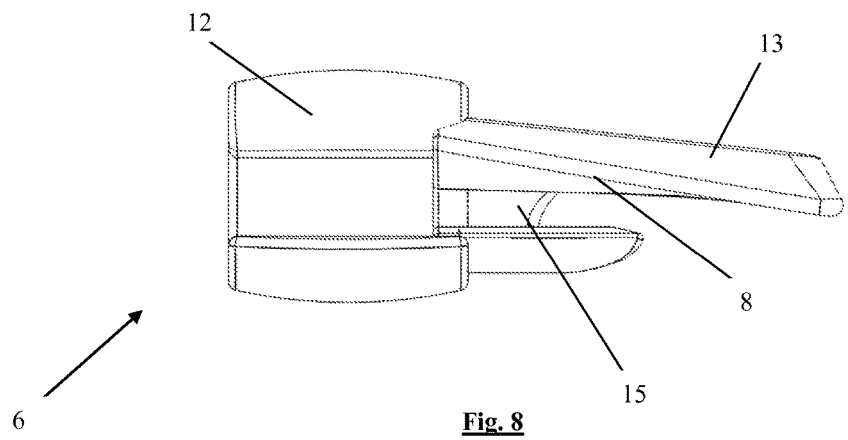
FIG. 8 shows a front view of a retaining support of the wiper illustrated in FIGS. 1 to 3.
Figure 9:
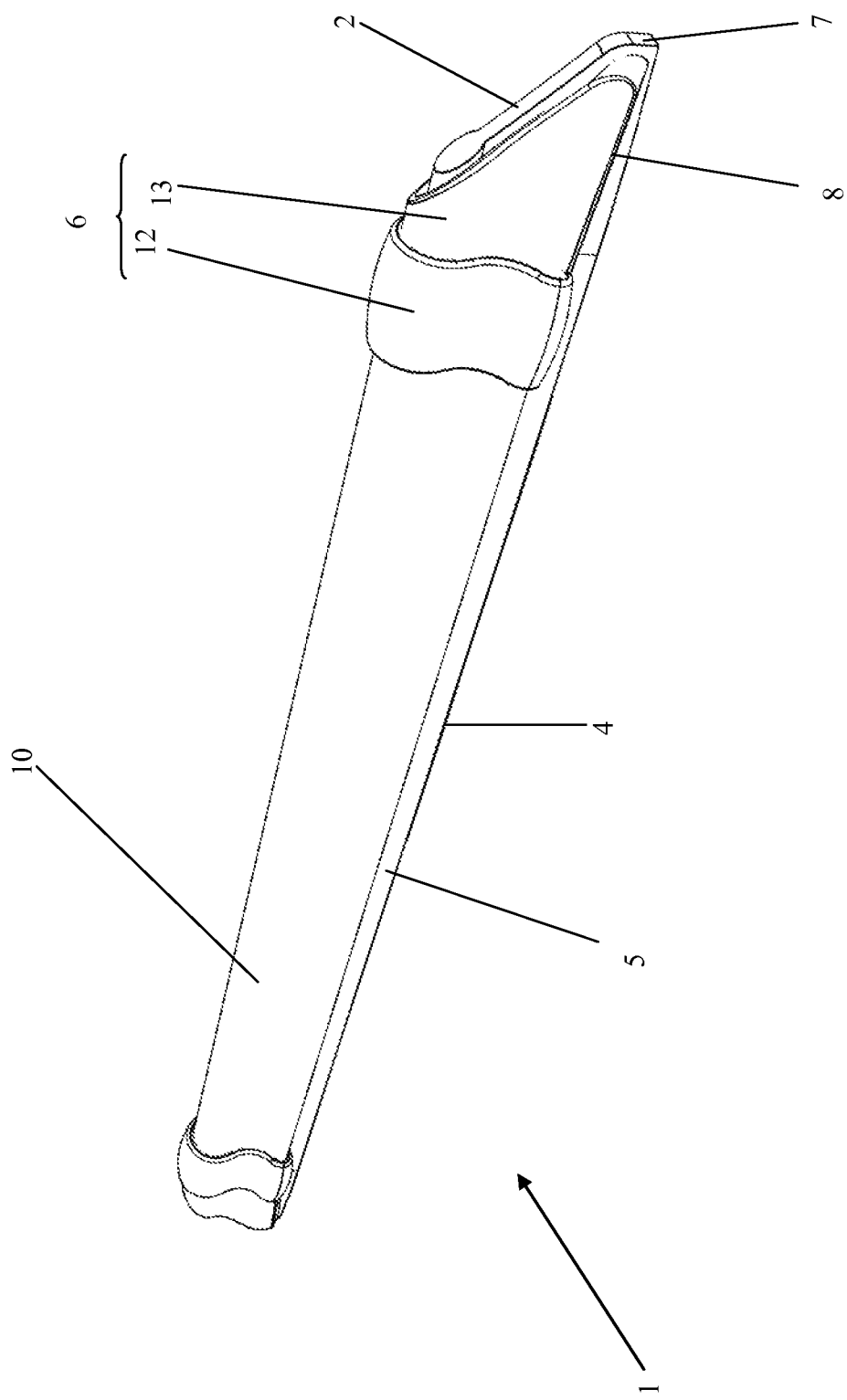
FIG. 9 shows a perspective view of the wiper illustrated in FIGS. 1 to 3.

The wiper (1) comprises an elongate cleaning strip (2), made of rubber, and a holder (3) for fixating the cleaning strip (2). Viewed along the longitudinal direction (9) of the cleaning strip (2), the cleaning strip (2) comprises a wiping edge (4) for wiping panes, and a wiping strip (5) comprising said wiping edge (4) which extends beyond the holder (3) along substantially its entire length.

The holder (3) comprises an elongate central portion (10) made of metal and two retaining supports (6) which are attached at the ends of the central portion (10). The retaining supports (6) are made of polypropylene and have a certain degree of flexibility. The flexibility of the retaining supports (6) is not as great as the flexibility of the cleaning strip (2). The retaining supports (6) are glued to the central portion (10). In an alternative embodiment, the retaining supports may also be attached to the central portion by clamping, without gluing.

The central portion (10) is a bent metal plate. This metal plate is bent in such a way that the central portion (10) comprises a channel part (18) with a channel (14) and a plate part (17), the plate part (17) extending from one side of the channel part (18).

Each retaining support (6) comprises a clamp part (12) which is clamped on and glued to an end of the central portion (10) and comprises a support part (13) with a support surface for retaining the cleaning strip (2).

Furthermore, the cleaning strip (2) is releasably connectable to the holder (3). If the cleaning strip (2) is connected to the holder (3) and the wiper (1) is therefore able to perform its wiping function, the wiper (1) is constructed as follows:

Viewed along the longitudinal direction (9) of the cleaning strip (2), an end strip is arranged in the channel (14) of the holder (3) and in a channel (15) of the support part (13) of the retaining support (6). The channel (14) of the holder (3) and the channel (15) of the support part (13) are in line with one another. The end strip of the cleaning strip (2) is situated in said channels (14, 15) and is retained in the holder (3) in this way. The bottom surface of the cleaning strip (2) is only partly covered by said channels (14, 15). In this case, the holder (3) is no obstacle to placing the bottom surface of the cleaning strip (2) against a pane. Since the cleaning strip (2) is made of rubber, it has a certain flexibility, as a result of which the cleaning strip (2) will bend upwards when the bottom surface of the cleaning strip (2) is positioned on a pane. The plate part (17) of the central portion (10) extends along the top surface of the cleaning strip (2) between the end strip and the wiping strip (5) comprising the wiping edge (4). As a result thereof, the upward movement of the cleaning strip (2) is limited. This is necessary to ensure that the cleaning strip (2) does not bend too far, so that the wiping edge (4) always makes contact with the pane during wiping of the pane.

At the location of the ends (7) of the wiping strip (5), the support surfaces of the support parts (13) extend along the wiping strip (5) substantially as far as the wiping edge (4). The bottom end edge (8) of the support part (13) which extends at the front side of the wiper (1) makes an angle ((3) of +/−10° with the longitudinal direction (9) of the cleaning strip (2), viewed in the plane of the top surface of the cleaning strip (2), and makes an angle (α) of +/−10° with the longitudinal direction (9) of the cleaning strip (2), viewed at right angles to the plane of the top surface of the cleaning strip (2). Furthermore, the end portions of the cleaning strip (2) are bevelled from the rear side to the front side, so that the wiping strip (5) comprising the wiping edge (4) is longer than said end strip. The end portions of the cleaning strip (2) make an angle of substantially 48° with the longitudinal direction (9) of the cleaning strip (2). Each support part (13) of said retaining support (6) has substantially the same bevel as the ends of the cleaning strip (2). The end (11) of the support part (13) extends entirely along a said end portion of the cleaning strip (2), so that substantially the top surface of the cleaning strip (2) is delimited by the support parts (13) at the location of said end portions of the cleaning strip (2). As a result thereof, upward displacement of the wiping strip (5) is limited at the location of its ends (7).

Furthermore, the retaining supports (6) are configured such that they make contact with the cleaning strip (2) at the location of its end portions and that they become further removed from the cleaning strip (2) in the direction of the central portion (10). As a result thereof, the space (16) between the retaining supports (6) and the cleaning strip (2) increases in the direction of the central portion (10). This means that the ends (7) of the wiping strip (5) with wiping edge (4) are retained very reliably and that the wiping strip (5) is also still retained in the vicinity of said ends (7) thereof, but to a lesser degree than said ends (7) themselves.

The retaining supports (6) are made of polypropylene and have a certain elasticity. The elasticity is less than that of the rubber of the cleaning strip (2), so that these retaining supports (6) are able to partly prevent the bending of the cleaning strip (2). The ends (7) of the wiping strip (5) themselves are partly pressed down by the support parts (13) at the location of the wiping edge (4), as a result of which the wiping strip (5) is bent to a certain degree in the direction towards its ends (7). Since the support parts (13) have a certain elasticity, this bending of its ends (7) may be annulled by placing the wiping edge (4) against a pane in order to wipe the pane. The wiping edge (4) then forms a substantially straight line, so that the wiper (1) is able to wipe the pane across its entire length. Due to the retaining supports (6), the risk of the ends (7) of the wiping strip (5) with the wiping edge (4) moving from the pane onto the rim of the pane is reduced.

The holder (3) is usually also provided with a handle for better maneuverability of the holder (3). The handle is not shown in the figures.

The invention claimed is:

1. Wiper comprising an elongate cleaning strip which is substantially made of flexible material and a holder for fixating the cleaning strip, wherein the cleaning strip comprises a wiping strip which protrudes with respect to the holder along substantially its entire length and comprises a wiping edge which extends along the longitudinal direction of the cleaning strip wherein the holder, at the location of the two ends of the wiping strip, comprises a respective retaining support with a support surface which extends opposite the surface of the wiping strip and extends substantially up to the wiping edge in order to retain the wiping strip locally during use of the wiper, wherein, viewed along the longitudinal direction of the cleaning strip, a distance between the support surface of the retaining supports and the surface of the wiping strip diminishes towards the ends of the wiping strip.

2. Wiper according to claim 1, wherein the retaining supports, at least at the location of the wiping strip, are substantially made of a material whose elasticity is lower than the elasticity of the material of the cleaning strip.

3. Wiper according to claim 1, wherein the retaining supports, at least at the location of the wiping strip are substantially made of a material with a hardness of less than 150 Shore D.

4. Wiper according to claim 2, wherein the retaining supports, at least at the location of the wiping strip, are substantially made of plastic.

5. Wiper according to claim 1, wherein the support surface of each retaining support touches an opposite surface of the wiping strip at the location of the ends of the wiping strip.

6. Wiper according to claim 5, wherein the retaining supports keep the wiping strip, at the location of its ends, in a bent position with respect to the longitudinal direction of the wiping strip.

7. Wiper according to claim 1, wherein each retaining support has an end edge which extends along the surface of the wiping strip almost as far as the wiping edge, and which in this case makes an angle with the longitudinal direction, this angle being between 5 and 30°.

8. Wiper according to claim 1, wherein the holder comprises an elongate central portion which extends along the longitudinal direction of the cleaning strip, and in that the retaining supports are attached to the ends of the central portion and thus form the ends of the holder.

9. Wiper according to claim 8, wherein the central portion has a plate part which extends along the top surface of the cleaning strip up to said wiping strip with wiping edge, so that the wiping strip remains free, and in that each retaining support comprises an end edge which continues above the wiping strip from the plate part and extends obliquely to the end of the wiping strip at the location of the wiping edge at an angle with the longitudinal direction, viewed along the plane of the top surface, said angle being between 5° and 20°.

10. Wiper according to claim 8, wherein the central portion is substantially made of metal.

11. Wiper according to claim 8, wherein the retaining supports extend along the end portions of the cleaning strip.

12. Wiper according to claim 11, wherein the end portions of the cleaning strip are bevelled in the direction of the wiping edge.

13. Wiper according to claim 12, wherein the end portions of the cleaning strip are bevelled divergently in the direction of the wiping edge.

* * * * *